US011662921B2

(12) United States Patent
Gottin et al.

(10) Patent No.: US 11,662,921 B2
(45) Date of Patent: May 30, 2023

(54) SYSTEM AND METHOD FOR MANAGING LATENCY PREDICTION FOR A STORAGE SYSTEM

(71) Applicant: EMC IP Holding Company LLC, Hopkinton, MA (US)

(72) Inventors: Vinicius Michel Gottin, Rio de Janeiro (BR); Jaumir Valenca Da Silveira Junior, Rio de Janeiro (BR); Renan De Campos, Whitinsville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/160,638

(22) Filed: Jan. 28, 2021

(65) Prior Publication Data

US 2022/0236895 A1     Jul. 28, 2022

(51) Int. Cl.
*G06F 3/06*     (2006.01)
(52) U.S. Cl.
CPC ............ *G06F 3/0629* (2013.01); *G06F 3/067* (2013.01); *G06F 3/0613* (2013.01); *G06F 3/0653* (2013.01)
(58) Field of Classification Search
None
See application file for complete search history.

(56) References Cited

U.S. PATENT DOCUMENTS

| 10,587,527 | B1* | 3/2020 | Paulzagade | H04L 41/0896 |
|---|---|---|---|---|
| 2017/0168729 | A1* | 6/2017 | Faulkner | G06F 3/0631 |
| 2018/0032387 | A1* | 2/2018 | Hiran | G06F 11/3447 |
| 2021/0334253 | A1* | 10/2021 | Darji | G06F 3/067 |
| 2021/0405915 | A1* | 12/2021 | Agarwal | G06F 3/0604 |

* cited by examiner

*Primary Examiner* — Edward J Dudek, Jr.
*Assistant Examiner* — Ralph A Verderamo, III
(74) *Attorney, Agent, or Firm* — Chamberlain, Hrdlicka, White, Williams & Aughtry

(57) ABSTRACT

An information handling system for managing a storage system includes storage and a storage manager. The storage is for storing a concurrency effect model for the storage system. The storage manager obtains a request for a latency prediction for the storage system; obtains media access time estimates for the storage system using a trace that specifies: a series of accesses; and responses, by the storage system, to the series of accesses; obtain concurrency estimates for the trace using the media access time estimates; obtains modifications for the media access time estimates using: the concurrency effect model; and the concurrency estimates; updates the media access time estimates using the modifications to obtain a latency prediction for the storage system; and performs an action set, based on the latency prediction, to manage operation of the storage system.

14 Claims, 11 Drawing Sheets

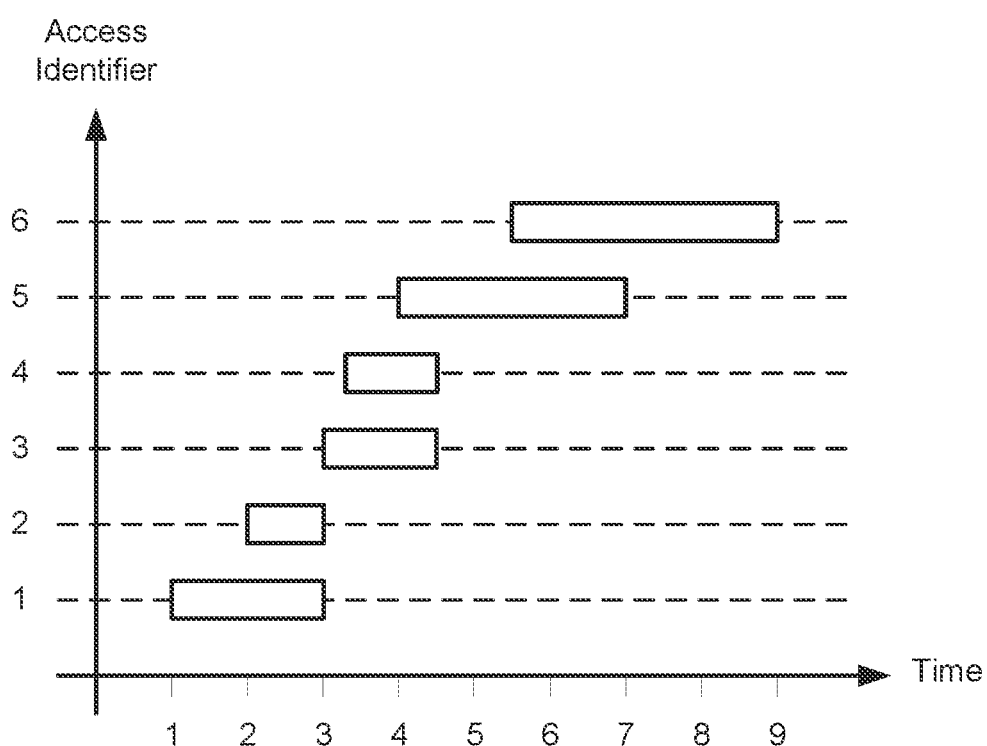
FIG. 6.1

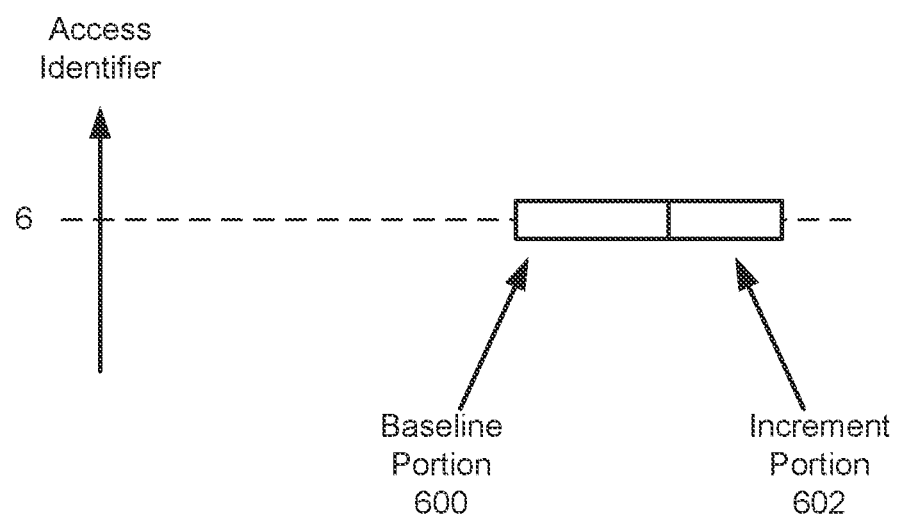
FIG. 6.2

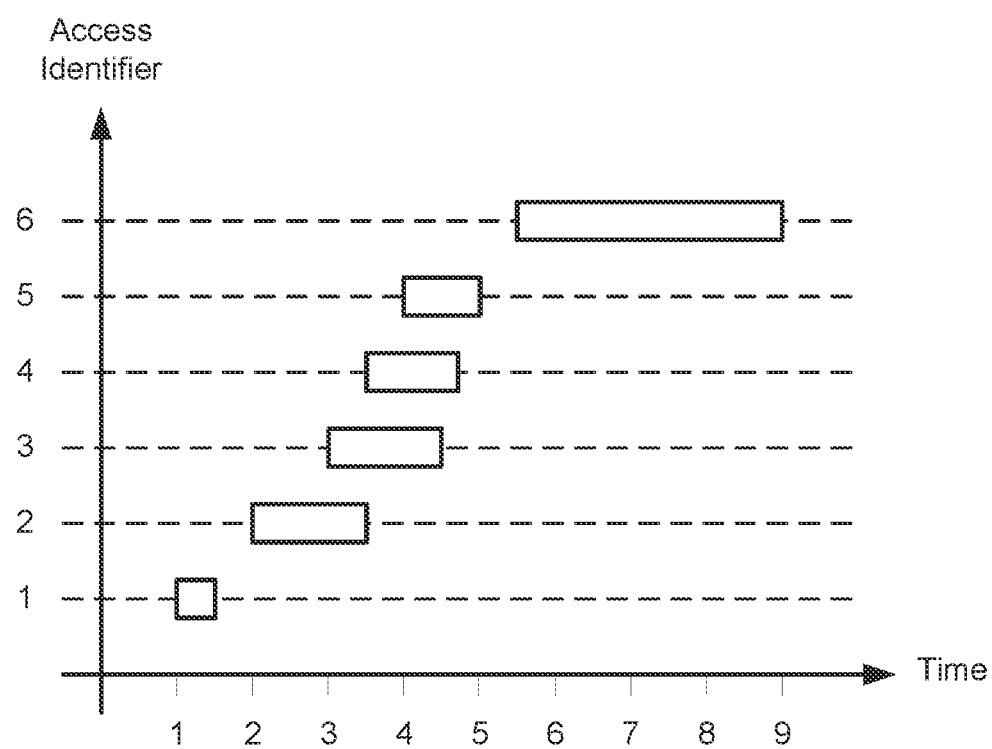
FIG. 6.3

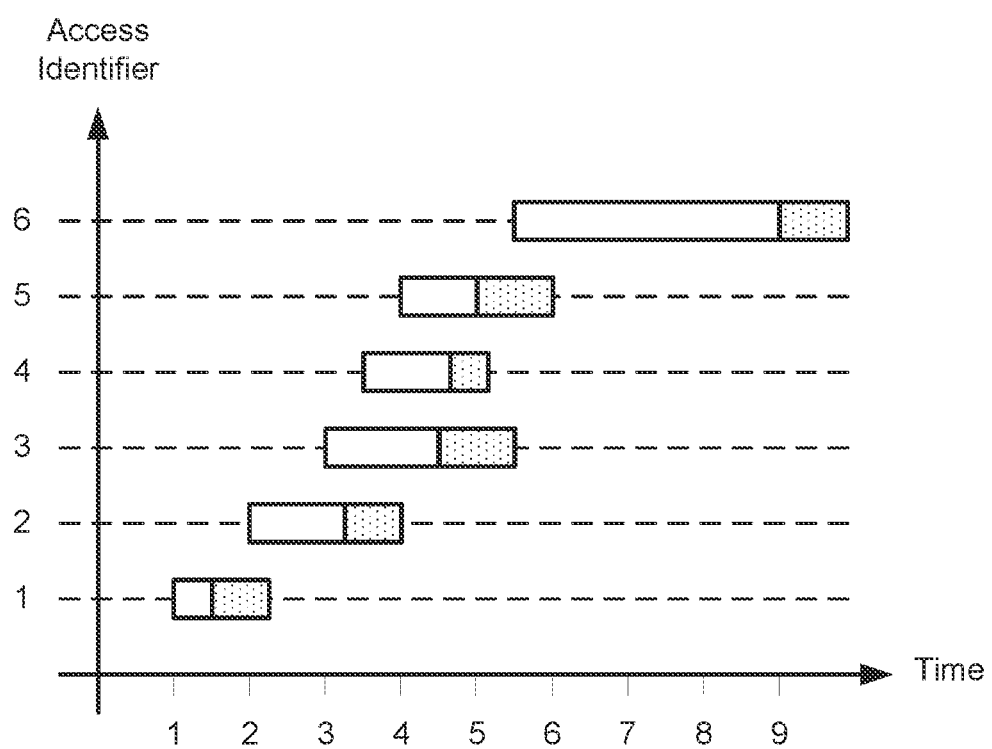
FIG. 6.4

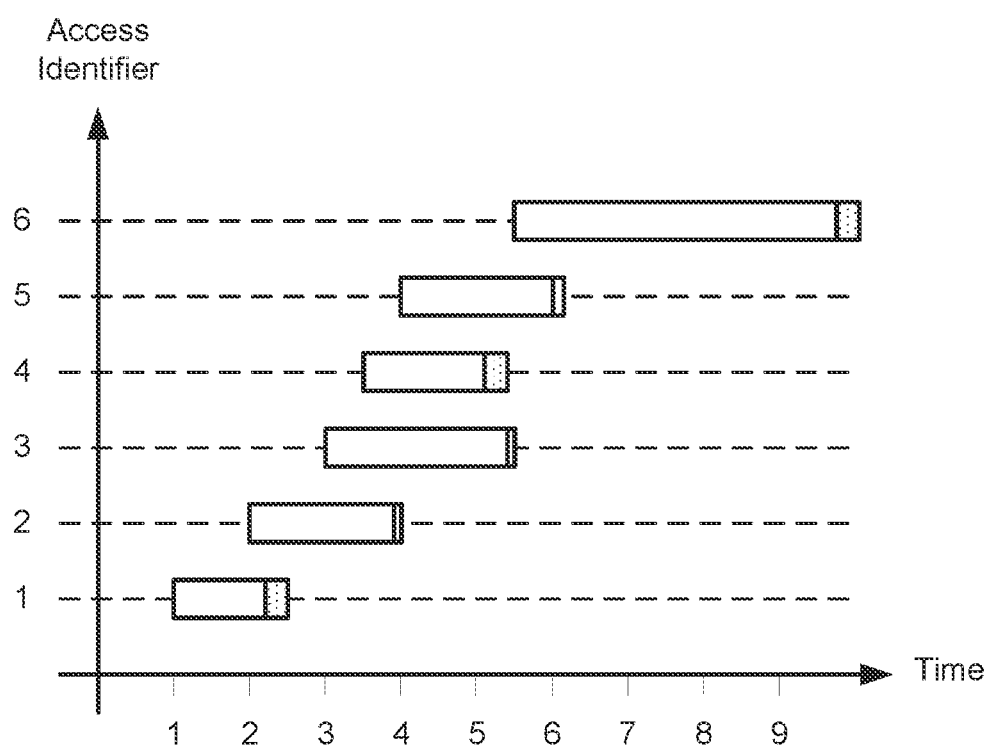
FIG. 6.5

SYSTEM AND METHOD FOR MANAGING LATENCY PREDICTION FOR A STORAGE SYSTEM

BACKGROUND

Computing devices may provide services. To provide the services, the computing devices may include hardware components and software components. The services provided by the computing devices may be limited by these components.

SUMMARY

In one aspect, an information handling system for managing a storage system in accordance with one or more embodiments of the invention includes storage for storing a concurrency effect model for the storage system; and a storage manager that obtains a request for a latency prediction for the storage system; obtains media access time estimates for the storage system using a trace that specifies: a series of accesses; and responses, by the storage system, to the series of accesses; obtain concurrency estimates for the trace using the media access time estimates; obtains modifications for the media access time estimates using: the concurrency effect model; and the concurrency estimates; updates the media access time estimates using the modifications to obtain a latency prediction for the storage system; and performs an action set, based on the latency prediction, to manage operation of the storage system.

In one aspect, a method for managing a storage system in accordance with one or more embodiments of the invention includes obtaining a request for a latency prediction for the storage system; obtaining media access time estimates for the storage system using a trace that specifies: a series of accesses; and responses, by the storage system, to the series of accesses; obtaining concurrency estimates for the trace using the media access time estimates; obtaining modifications for the media access time estimates using: a concurrency effect model associated with the storage system; and the concurrency estimates; updating the media access time estimates using the modifications to obtain a latency prediction for the storage system; and performing an action set, based on the latency prediction, to manage operation of the storage system.

In one aspect, a non-transitory computer readable medium in accordance with one or more embodiments of the invention includes computer readable program code, which when executed by a computer processor enables the computer processor to perform a method for managing a storage system. The method includes obtaining a request for a latency prediction for the storage system; obtaining media access time estimates for the storage system using a trace that specifies: a series of accesses; and responses, by the storage system, to the series of accesses; obtaining concurrency estimates for the trace using the media access time estimates; obtaining modifications for the media access time estimates using: a concurrency effect model associated with the storage system; and the concurrency estimates; updating the media access time estimates using the modifications to obtain a latency prediction for the storage system; and performing an action set, based on the latency prediction, to manage operation of the storage system.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIGS. 6.1-6.5 show diagrams illustrating traces of access patterns used by an example system over time in accordance with one or more embodiments of the invention.

DETAILED DESCRIPTION

Figure 1:
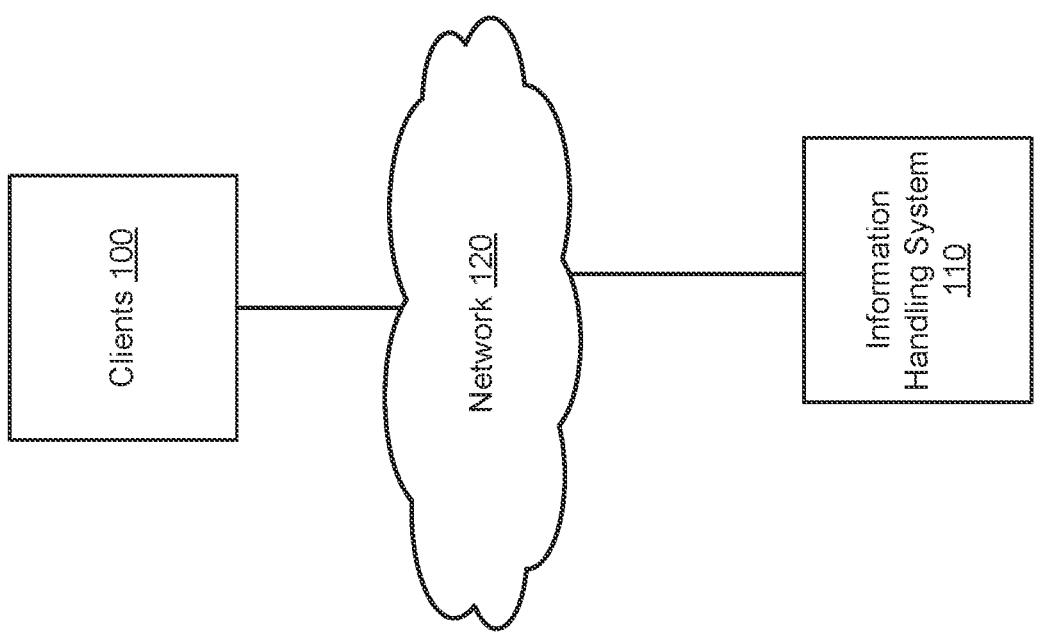
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for providing computer implemented services. To provide computer implemented services, computing resources may be consumed by applications or other entities that provide the computer implemented services. The type and quantity of computer implemented services that may be provided may be limited based on the availability of computing resources. Further, the manner in which the computing resources are used may impact their availability and corresponding quality of the provided computer implemented service.

For example, consider a scenario in with a storage system is being used by an application to store data. The configuration of the storage system, quantity and type of components of the storage system, and other characteristics of the storage system may impact how quickly data access requests by the application may be serviced by the storage system. However, due to the large number of characteristics of the storage system, it may be impractical to build every possible implementation of a storage system to ascertain its ability to service storage requests in each respective configuration.

A system in accordance with embodiments of the invention may provide a method of predicting how quickly storage access requests are likely to be serviced by storage systems under varying load conditions and configurations of the storage system. By doing so, embodiments of the invention may enable (i) storage systems for deployments to be effectively sized based on the workloads that will be performed by the deployments, (ii) varying configurations of existing storage systems to ascertain which bests suits a particular workload thereby enabling the existing storage system to be reconfigured to suit the workload, and (iii) prior to performing a workload, evaluate whether the workload or alternative implementations of a workload should be employed to maximize the utility of existing storage systems.

To generate the predictions, the system may first identify the level of concurrency in an access pattern that will be imposed on a storage system when a particular workload is performed. The level of concurrency may reflect how many separate accesses of the storage system will be concurrently serviced by the storage system when each access is serviced. The level of concurrency, access patterns, and other information may be used to train a concurrency effect model that is able to predict how concurrency impact the response times for servicing each of the accesses.

Once trained on a particular access pattern, the concurrency effect model may be usable to predict the amount of latency for servicing other access patterns and for different configurations of storage systems. Consequently, once trained, the concurrency effect model may be used to service latency prediction requests for corresponding access patterns associated with workloads.

Turning to FIG. 1, FIG. 1 shows a system in accordance with one or more embodiments of the invention. The system may include any number of clients (100). The clients (100) may provide computer implemented services to users of the clients (100) and/or other devices (e.g., other clients). The clients (100) may provide any number and type of computer implemented services (e.g., data storage services, electronic communication services, etc.).

To provide these computer implemented services, the entities hosted by the clients (e.g., applications) may utilize hardware devices of the clients. For example, the clients (100) may include processors, memory, storage systems, and/or other types of devices that contribute computing resources (e.g., processing resources, memory resources, storage resources, etc.).

The computer implemented services provided by the entities hosted by the clients (100) may be limited based on the quantity of available computing resources. For example, providing computer implemented services may consume computing resources. Consequently, the rate at which computer implemented services may be provided and/or the quality of the provided computer implemented services may depend on the availability of the computing resources.

The availability of computing resources may depend on the quantity and configuration of hardware devices of the clients (100). For example, clients (e.g., 100) that have access to more hardware devices may have more computer resources usable to provide computer implemented services than other clients that have fewer hardware devices.

Additionally, the quality of computer implemented services of the entities hosted by the clients (100) may depend on the configuration of the hardware devices. Because similar hardware devices may provide computing resources in different manners based on their configurations, the rates at which these computing resources may be consumed to provide different computer implemented services may depend on the type of computer implemented services to be provided.

In general, embodiments of the invention relate to systems, devices, and methods for improving the efficiency of providing computer implemented services using computing resources. Specifically, embodiments of the invention may provide for computer implemented services that more efficiently consume computing resources. By doing so, clients (100) in accordance with embodiments of the invention may provide larger numbers of computer implemented services having desired qualities.

To do so, the system of FIG. 1 may include an information handling system (110) that provides resource management services to the clients (100). The resource management services may include (i) obtaining information regarding the use of computing resources for providing computer implemented services, (ii) estimating how different hardware devices and configurations for those hardware devices may impact the consumption of computing resources for providing the computer implemented services, and/or (iii) taking action, based on the estimates, to improve the consumption of computing resources for providing the computer implemented services.

To enable the information handling system (110) to perform its functionality, the clients (100) may cooperate by, for example, providing information regarding their workloads being performed, their hardware and/or software components, the configurations of the hardware and/or software components, and/or other information that may be requested by the information handling system (110). Additionally, the clients (100) may perform one or more actions specified by the information handling system (110). For example, as will be discussed below, after the information handling system (110) has analyzed the operation of a client, the information handling system (110) may take action by instructing the client to perform actions. Performing the actions may improve the efficiency of use of computing resources to provide computer implemented services and/or provide other benefits.

The system of FIG. 1 may include any number of clients (100) and information handling systems (110) that provide resource management services to the clients (100). Any of the components of FIG. 1 may be operably connected to any other component and/or other components not illustrated in FIG. 1 via one or more networks (e.g., 120). The networks (e.g., 120) may be implemented using any combination of wired and/or wireless network topologies. The networks may employ any number and type of communication scheme to enable the clients (100) and information handling systems to communicate with each other.

The clients (100) and information handling system (110) may be implemented using computing devices. The computing devices may include, for example, a server, laptop computer, a desktop computer, a node of a distributed system, etc. The computing device may include one or more processors, memory (e.g., random access memory), and/or persistent storage (e.g., disk drives, solid state drives, etc.). The persistent storage may store computer instructions, e.g., computer code, that (when executed by the processor(s) of the computing device) cause the computing device to perform the functions of the clients (100) and information handling system (110) described in this application and/or all, or a portion, of the methods illustrated in FIGS. 3-4. The clients (100) and information handling system (110) may be implemented using other types of computing devices without departing from the invention. For additional details regarding computing devices, refer to FIG. 6. For additional details regarding the information handling system (110), refer to FIG. 2.

While the system of FIG. 1 has been illustrated and described as including a limited number of specific components, a system in accordance with embodiments of the invention may include additional, fewer, and/or different components without departing from the invention.

Figure 2:
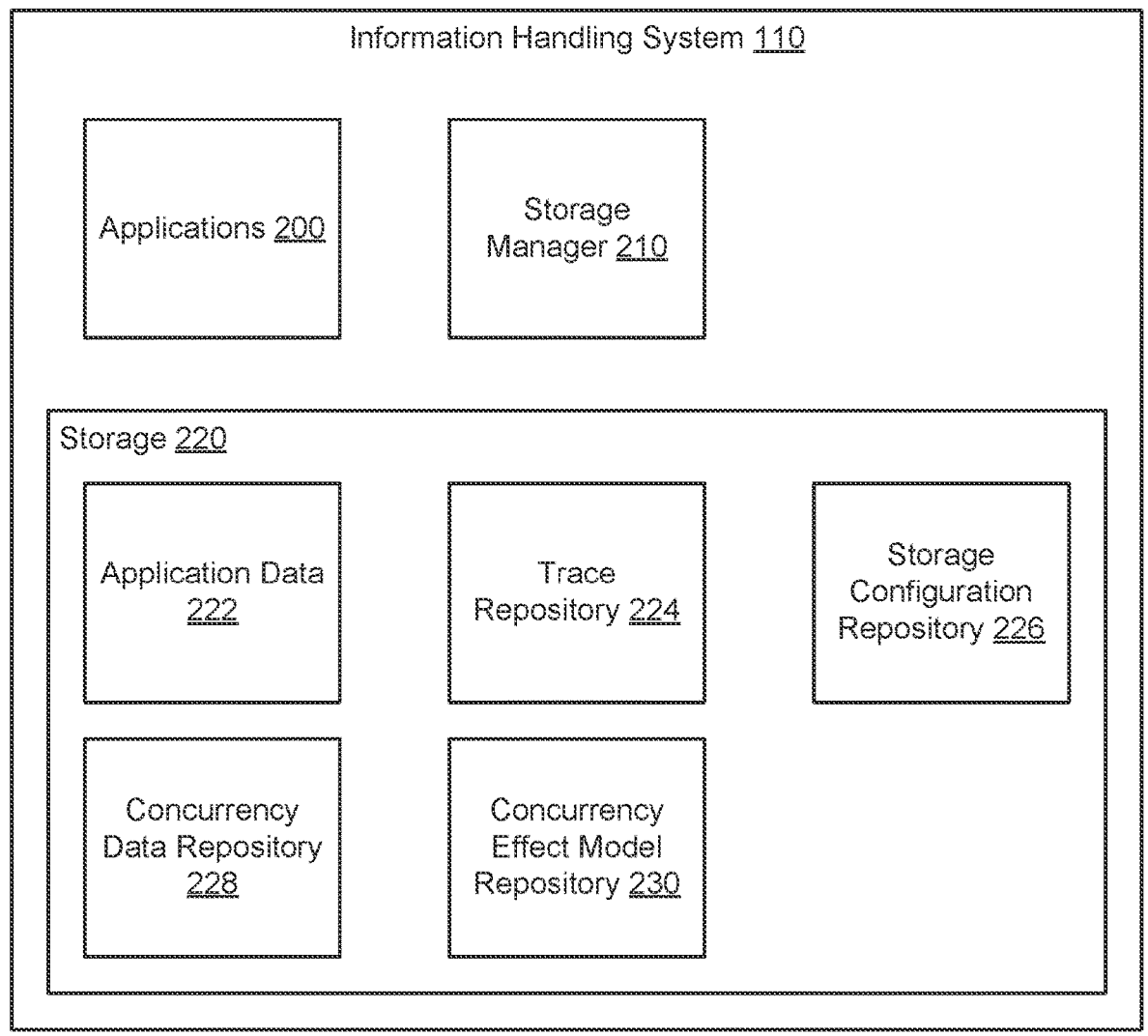
FIG. 2 shows a diagram of an information handling system in accordance with one or more embodiments of the invention.

Turning to FIG. 2, FIG. 2 shows a diagram of an information handling system (110) in accordance with one or more embodiments of the invention. As discussed above, the information handling system (110) may provide resource management services.

To provide resource management services, the information handling system (110) may include applications (200), a storage manager (210), and storage (220). Each of these components is discussed below.

The applications (200) may provide computer implemented services. The applications (200) may be similar to or different from applications hosted by clients that provide similar or different computer implemented services. As will be discussed in greater detail below, the storage manager (210) may provide resource management services for the applications (200). The storage manager (210) may provide similar resource management services to applications hosted by clients.

The storage manager (210) may provide resource management services to applications and/or other types of entities. The management services may be used to predict the likely access times for storage systems. For example, when an application performs its functionality, it may generate a series of storage access requests. The storage system may service the access requests over corresponding periods of times (e.g., response times). The combination of access requests and response times in a chronological ordering may be referred to as a trace. For additional details regarding traces, refer to FIG. 3 and the corresponding description.

To provide resource management services, the storage manager (210) may (i) obtain a concurrency model for a storage system (or component thereof/combination of components), (ii) use the concurrency model to predict how different storage systems and/or different configurations of the storage systems will respond to various types of access requests, and (iii) based on the predictions, take action to improve the responses to the storage system. By doing so, the quality of the computer implemented services provided by applications may be improved and/or availability of computing resources may be improved.

To obtain the concurrency model, the storage manager (210) may utilize any learning model, a known configuration for the storage system, and known access request/response times. The known access/response times may be analyzed to obtain concurrency levels between the known access requests. The learning model may then utilize the access request/response times and concurrency levels as input to generate the concurrency model.

After being generated, a hypothetic access pattern (e.g., portion of a trace) for a different configuration of the storage system may be obtained. Consequently, no responses for the hypothetical access pattern may be known. The concurrency model may be used to obtain response time estimations for the hypothetical access pattern. The response time estimations may then be used to obtain an overall latency prediction for the hypothetical access pattern.

Once the latency prediction is obtained, it may be compared to predetermined thresholds that indicate whether the latency prediction is desirable. If the latency prediction is undesirable, then other configurations for the storage system may be investigated until one returns a desirable latency prediction. The identified storage system configuration may then be used to improve the operation of the storage system for the access pattern by, for example, modifying the configuration of the storage system based on the identified storage system configuration.

Figure 4:
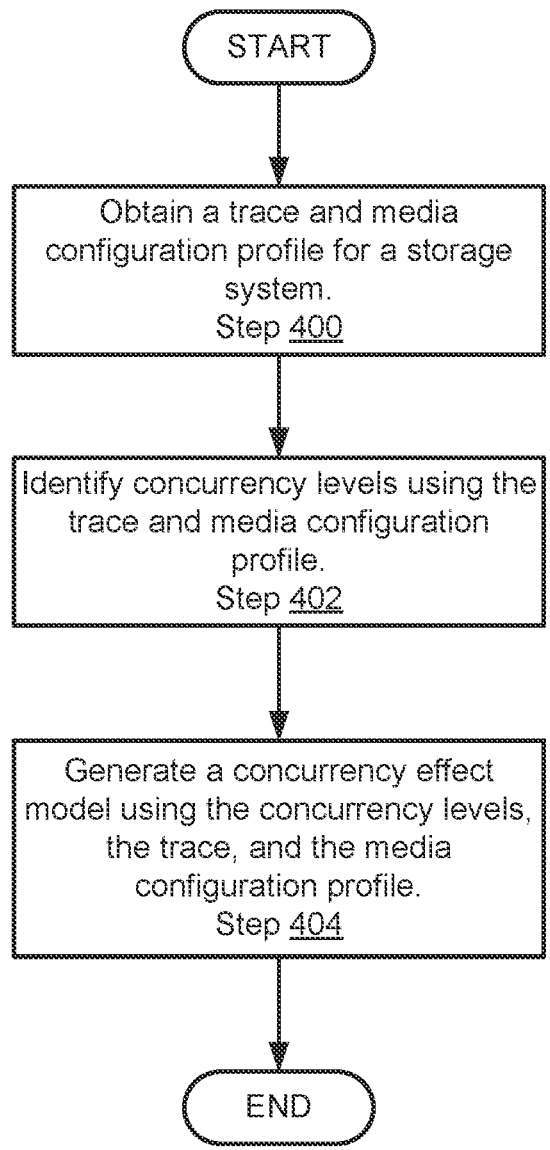
FIG. 4 shows a flowchart of a method of obtaining a concurrency effect model in accordance with one or more embodiments of the invention.
Figure 5:
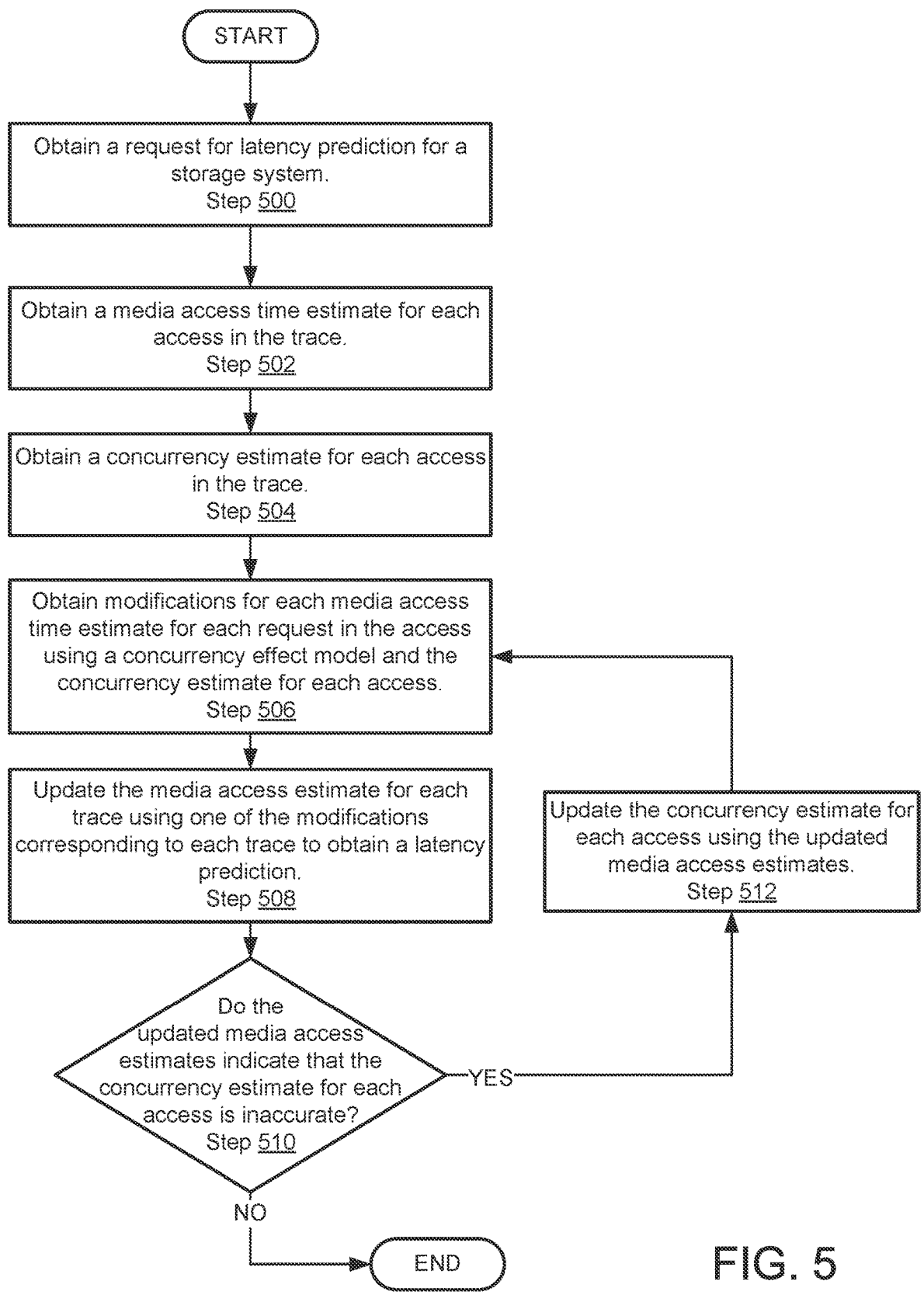
FIG. 5 shows a flowchart of a method of managing resources using a concurrency effect model in accordance with one or more embodiments of the invention.

When providing its functionality, the storage manager (210) may perform all, or a portion, of the methods illustrated in FIGS. 4-5.

In one or more embodiments of the invention, the applications (200) and/or storage manager (210) are implemented using a hardware device including circuitry. The hardware device may be, for example, a digital signal processor, a field programmable gate array, or an application specific integrated circuit. The circuitry may be adapted to cause the hardware device to perform the functionality of the applications (200) and/or storage manager (210). The applications (200) and/or storage manager (210) may be implemented using other types of hardware devices without departing from the invention.

In one or more embodiments of the invention, the applications (200) and/or storage manager (210) are implemented using a processor adapted to execute computing code stored on a persistent storage that when executed by the processor performs the functionality of the applications (200) and/or storage manager (210). The processor may be a hardware processor including circuitry such as, for example, a central processing unit or a microcontroller. The processor may be other types of hardware devices for processing digital information without departing from the invention.

As used herein, an entity that is programmed to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In one or more embodiments disclosed herein, the storage (220) is implemented using physical devices that provide data storage services (e.g., storing data and providing copies of previously stored data). The devices that provide data storage services may include hardware devices and/or logical devices. For example, storage (220) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage (220) may include a memory device (e.g., a dual in line memory device) in which data is stored and from which copies of previously stored data are provided. In another example, storage (220) may include a persistent storage device (e.g., a solid-state disk drive) in which data is stored and from which copies of previously stored data is provided. In a still further example, storage (220) may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

The storage (220) may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

The storage (220) may store data structures including, for example, application data (222), a trace repository (224), a storage configuration repository (226), a concurrency data repository (228), and a concurrency effect model repository (230). Each of these data structures is discussed below.

The application data (222) may be implemented using one or more data structures that includes information utilized by the applications (200). For example, the applications (200) may store any type and quantity of data in the application data (222). Consequently, the applications (200) may perform workloads that result in access patterns for the storage (220). The response by the storage (220) to these access requests may depend on the components of the storage (220), the configurations of the components, and/or other factors related to the storage (220).

The application data (222) may be maintained by, for example, the applications (200). For example, the applications (200) may add, remove, and/or modify information included in the application data (222).

The data structures of the application data (222) may be implemented using, for example, lists, tables, unstructured data, databases, etc. While illustrated in FIG. 2 as being stored locally, the application data (222) may be stored remotely and may be distributed across any number of devices without departing from the invention.

The trace repository (224) may be implemented using one or more data structures that includes information regarding traces. The traces may include information regarding access patterns for applications and the corresponding responses to these access patterns by storage systems. Trace repository (224) may include any type and quantity of information regarding traces.

The trace repository (224) may also include information regarding the storage systems that serviced the access patterns. This information may include, for example, identifiers of the storage systems, composition of the storage systems, configurations of the devices of the storage systems, and/or other types of information regarding the operation of storage systems.

The trace repository (224) may be maintained by, for example, the storage manager (210). For example, the storage manager (210) may add, remove, and/or modify information included in the trace repository (224). The storage manager (210) may obtain information regarding traces from, for example, an operating system or other entity that manages the storage of data in storage systems.

The data structures of the trace repository (224) may be implemented using, for example, lists, tables, unstructured data, databases, etc. While illustrated in FIG. 2 as being stored locally, the trace repository (224) may be stored remotely and may be distributed across any number of devices without departing from the invention.

The storage configuration repository (226) may be implemented using one or more data structures that includes information regarding storage systems that have services access patterns of traces. This information may include, for example, identifiers of the storage systems, composition of the storage systems, configurations of the devices of the storage systems, and/or other types of information regarding the operation of storage systems.

The storage configuration repository (226) may be maintained by, for example, the storage manager (210). For example, the storage manager (210) may add, remove, and/or modify information included in the storage configuration repository (226). The storage manager (210) may obtain information regarding storage systems from, for example, an operating system or other entity that manages the storage of data in storage systems.

The data structures of the storage configuration repository (226) may be implemented using, for example, lists, tables, unstructured data, databases, etc. While illustrated in FIG. 2 as being stored locally, the storage configuration repository (226) may be stored remotely and may be distributed across any number of devices without departing from the invention.

The concurrency data repository (228) may be implemented using one or more data structures that includes information generated by concurrency effect models. This information may include, for example, predictions regarding responses to access patterns. The information may include the time that a storage system is likely to take to respond to each access of the access pattern. The information may be generated by a concurrency effect model that takes, as input, an access pattern and concurrency levels of the access pattern. The output of the concurrency effect model may be the likely time it will take to respond to each access in the access pattern.

The concurrency data repository (228) may be maintained by, for example, the storage manager (210). For example, the storage manager (210) may add, remove, and/or modify information included in the concurrency data repository (228).

The data structures of the concurrency data repository (228) may be implemented using, for example, lists, tables, unstructured data, databases, etc. While illustrated in FIG. 2 as being stored locally, the concurrency data repository (228) may be stored remotely and may be distributed across any number of devices without departing from the invention.

The concurrency effect model repository (230) may be implemented using one or more data structures that includes information regarding concurrency effect models and/or the concurrency effect models. The information and/or models may be used to generate predictions of responses (e.g., times to respond/service various access requests of a trace) to access patterns.

The concurrency effect model repository (230) may be maintained by, for example, the storage manager (210). For example, the storage manager (210) may add, remove, and/or modify information included in the concurrency effect model repository (230).

The data structures of the concurrency effect model repository (230) may be implemented using, for example, lists, tables, unstructured data, databases, etc. While illustrated in FIG. 2 as being stored locally, the concurrency effect model repository (230) may be stored remotely and may be distributed across any number of devices without departing from the invention.

While the storage (220) has been illustrated and described as including a limited number and type of data, a storage in accordance with embodiments of the invention may store additional, less, and/or different data without departing from the invention.

While the information handling system (110) has been illustrated and described as including a limited number of specific components, an information handling system in accordance with embodiments of the invention may include additional, fewer, and/or different components without departing from the invention.

Figure 3:
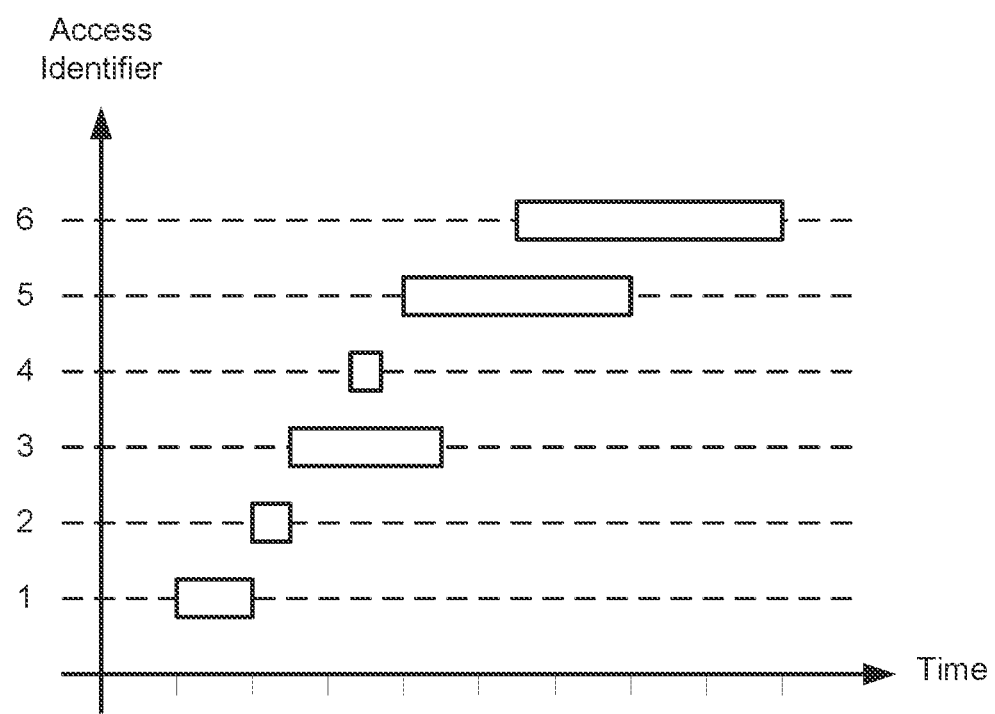
FIG. 3 shows a diagram of a trace in accordance with one or more embodiments of the invention.

Turning to FIG. 3, FIG. 3 shows a graph of an example trace in accordance with one or more embodiments of the invention. In the graph, time is indicated as increasing from left to right across the page. Individual accesses are illustrated along each dashed horizontal line. While six separate accesses are illustrated in FIG. 3, a trace may include any number of accesses without departing from the invention.

In FIG. 3, the boxes along each horizontal line indicates the duration of the response to the beginning of the respective access request which is at the left hand side of each box. For example, the access having identifier one occurs at the first tick, the access having identifier two occurs at the second tick, etc. Boxes that overlap with one another horizontally indicate a concurrent access.

For example, access having identifiers four and five both partially overlap access three. Consequently, access three is considered to be concurrent with both accesses four and five (i.e., access three has a concurrency of three), while accesses four has a concurrency of two because one because it only overlaps in time with three but not five. Like access three, access five also has a concurrency of three because it overlaps with both of three and six.

As discussed above, embodiments of the invention may utilize the presence of concurrencies to predict how long corresponding responses are likely to last in duration. By taking into account access concurrencies, the overall duration of servicing a particular access pattern may be predicted for a particular storage system and access pattern. These predictions may be utilized to determine which storage system and its configuration should be used to service access patterns or which access patterns should be employed with a corresponding storage system.

As discussed above, the system of FIG. 1 may provide resource management services by generating predictions of how access patterns will be processed and utilizing the predictions to modify the resources. FIGS. 4-5 illustrate methods that may be performed by components of the system of FIG. 1 to provide resource management services.

FIG. 4 shows a flowchart of a method in accordance with one or more embodiments of the invention. The method depicted in FIG. 4 may be performed to obtain a concurrency effect model in accordance with one or more embodiments of the invention. The method shown in FIG. 4 may be performed by, for example, an information handling system (e.g., 110, FIG. 1). Other components of the system in FIG. 1 may perform all, or a portion, of the method of FIG. 4 without departing from the invention.

While FIG. 4 is illustrated as a series of steps, any of the steps may be omitted, performed in a different order, additional steps may be included, and/or any or all of the steps may be performed in a parallel and/or partially overlapping manner without departing from the invention.

In step 400, a trace and a media configuration profile for a storage system are obtained. The trace and the media configuration profile may be obtained, for example, from a client (e.g., by requesting the data) or by monitoring use of a storage system hosted by the information handling system performing this method.

The trace may specify an access pattern and responses by the storage system to the access pattern. For example, the trace may include a time stamp or other indicator of when each access of the access pattern occurred, parameters associated with the request such as the request size, a type of the operation, and/or other types of information regarding the accesses of the access pattern. This information may be obtained by monitoring of a storage system or by using a simulation model or other synthetic method of obtaining the information. The trace may also include the media-access time for the storage system for each access request.

The media configuration profile may include information regarding the type and configuration of any number of components of the storage system. For example, the media configuration profile may specify the type and number of storage devices, the configuration of these storage devices, details regarding how caches are implemented, configuration for the caches, etc.

After the trace and media configuration profile are obtained, the trace may be preprocessed to obtain a baseline response time for each access in the accesses of the trace. For traces that include both access and responses (e.g., as illustrated in FIG. 3), then the response time for each access is utilized as the baseline response time for each access.

However, if response times for each access are unavailable, baseline response times may be estimated for each of the accesses. These may be obtained by using a latency profile for the configuration of the storage system. The latency profile may specify an average response time for the storage system which will be utilized as the baseline response time for each of the accesses.

Additionally, other information regarding the traces may be computed. For example, the difference between when each access occurs may be computed, the duration of each response may be calculated, and/or other calculations may be performed.

In step 402, concurrency levels for each of the accesses and corresponding responses may be determined using the trace and/or media configuration profile. A concurrency level may reflect how many accesses are being simultaneously processed. For example, with respect to FIG. 3, the first and second accesses may have concurrency levels of one because each box indicating the response duration for each access does not overlap with any other box in time. In contrast, access three has a concurrency level of three by virtue of overlapping with accesses four and five.

The concurrency of each access and response may be determined via any data analysis method without departing from the invention. For example, the different between the accesses calculated in step 400 may be compared to the duration of each baseline response time. Consequently, any baseline response that is shorter than the difference may indicate that there is no overlap between the duration of response of the access-response pairs. In such a scenario, the concurrency for each of the access-response pairs may not be incremented.

The result of calculating the concurrency of each access is at least a tuple that specifies: (i) when each access occurred, (ii) the duration of the response, and (iii) the concurrency for the access-response pair.

In one or more embodiments of the invention, the concurrency level is determined by determining, for each access, how many other access take place concurrently. As discussed above, the timestep or other temporal indicator for each access may be included in the trace. The trace may also include, as part of the tuple, the baseline response time for each access (which corresponds either to the media-access time, if available, or an estimation based on the media configuration latency profile).

Using the timestamp and duration of baseline response, a 'start' and 'length' of each access can be determined. The concurrency level of an access may correspond to the number of access that 'intersect' with it in time.

In one or more embodiments of the invention, the difference between each access (discussed with respect to step 400, referred to here as the interarrival time) may be used to calculate the concurrency of each access. For example, consider an access A, if the interarrival time is larger than the baseline response time for the access, then it is not concurrent with the next access B—nor any following request. Otherwise, a concurrency counter for the access may be incremented for both access A and B. Additionally, a check A is concurrent with the next access C may be performed by considering whether the sum of the interarrival times of accesses A and B is larger than the baseline response time.

The aforementioned process may continue in linear fashion until A is not concurrent to a request. The same process for may be performed for access B, and so forth until all of the accesses in a trace are processed.

More complex algorithms that leverage the data structures that include a trace may be used (e.g. sliding windows of the requests still 'running' along the time axis) without departing from the invention.

While the above analysis has been described with response to a storage system, in a scenario in which a storage system includes multiple storage media that are likely to have different access-response characteristics, the above analysis may be performed on a per-media level. Consequently, different groups of tuples for each media type may be obtained following the above analysis.

In step 404, a concurrency effect model is generated using the concurrency levels, the trace, and the media configuration profile. In other words, the tuples and the media configuration profile. The concurrency effect model may be generated by training a machine learning algorithm (or other learning technique) using the tuples and media configuration profile as input. The output of the machine learning model is an increment in duration of the response that, when combined with each baseline response, yields the actual response time of the trace.

In some embodiments of the invention, steps 400-404 may be performed for multiple traces resulting in a machine learning model that is trained based on all of the traces and corresponding concurrency levels. Doing so may generate a resulting predictive model that is more likely to accurately predict the increment for each response time.

The output of the machine learning model at this stage may be a list of increments for each corresponding access.

The method may end following step 404.

Using the method illustrated in FIG. 4, a predictive model may be generated that may be used to predict the likely response times for an access pattern. Consequently, the overall duration of the response for other access patterns may be ascertained. The duration of the responses to the access patterns may be used to refine the operation of the system, as will be discussed with respect to FIG. 5.

Turning to FIG. 5, FIG. 5 shows a flowchart of a method in accordance with one or more embodiments of the invention. The method depicted in FIG. 5 may be performed to manage a storage system using a concurrency effect model in accordance with one or more embodiments of the invention. The method shown in FIG. 5 may be performed by, for example, an information handling system (e.g., 110, FIG. 1). Other components of the system in FIG. 1 may perform all, or a portion, of the method of FIG. 5 without departing from the invention.

While FIG. 5 is illustrated as a series of steps, any of the steps may be omitted, performed in a different order, additional steps may be included, and/or any or all of the steps may be performed in a parallel and/or partially overlapping manner without departing from the invention.

In step 500, a request for a latency prediction for a storage system is obtained. The request may be obtained from any entity without departing from the invention. For example, a client may request the latency prediction.

The latency prediction may specify (i) the access pattern and (ii) the components of and/or configuration of the storage system. A concurrency effect model for the storage system may have already been generated using the method illustrated in FIG. 4.

A media-access time for the storage system is also provided with the request or is otherwise available. As discussed with respect to FIG. 4, the media-access time may specify a baseline response time for each component of a storage system. Thus, the baseline response time is already known or may be calculated for the components of and/or configuration of the storage system.

In step 502, a media access time estimate for each access in the trace is obtained. The media access time estimate for each request in the trace may be obtained using the media-access time. In other words, the media access time estimate may be the baseline response time for each access. Thus, a pair may be formed listing the access time for each access and the corresponding baseline response time for each access.

In step 504, a concurrency estimate for each access in the trace is obtained. The concurrency estimate for each access may be calculated similarly to step 402 in FIG. 4. Consequently, and order three tuples may be formed for each access in the trace listing the access time, the baseline response duration, and the concurrency level.

In step 506, a modification for each access time estimate for each access in the trace is obtained using a concurrency effect model and the concurrency estimate for each access. The concurrency effect model may take, as input, the tuples obtained in step 504. Based on this input, the concurrency effect model may provide the modification for each media access time estimate. These may be additional duration of time, beyond each baseline response duration, that is estimated to be necessary to service each corresponding access.

In step 508, the media access estimate for each trace is updated using one of the modification corresponding to each trace to obtain a latency prediction for the access pattern (e.g., the access pattern specified in the request). The media access estimate may be updated by increasing the duration of each media access estimate by the duration of the corresponding modification obtained in step 506. Thus, the tuple obtained in step 504 may be updated by adding the duration of each modification to the corresponding media access estimate specified by each, corresponding tuple.

In step 510, it is determined whether the updated media access estimates indicate that the concurrency estimate for each access is inaccurate.

The determination may be made by calculating the concurrency for each access in the tuple obtained in step 510. Because the duration of any number of media access requests in the tuple of step 508 more be greater than the duration of any number of media access requests in the tuple of step 504, the concurrency level of the tuples of step 508 may be greater than the concurrency level of the tuples of step 504.

If the difference in concurrency level of the tuples of step 508 and tuples of step 504 exceeds a predetermined threshold, then it may be determined that the updated media access estimates indicate that the concurrency estimate is inaccurate.

If it is determined that the updated media access estimates indicate that the concurrency estimate for each access is inaccurate, the method may proceed to step 512. Otherwise, the method may end following step 510.

In step 512, the concurrency estimate for each access is updated using the updated media access estimates. The concurrency estimate may be updated by calculating the concurrency level of each access using the process discussed with respect to step 402 using the updated media access time estimates obtained in step 508.

The method may proceed to step 506 following step 512.

By virtue of the loop included in step 506-512, an iterative processes of calculating media access estimates for each access. The process may proceed until the concurrency levels are no longer significantly increased when the media access estimates are updated in step 508 (e.g., the no path following step 510). In some embodiments of the invention, a maximum number of iterations may be put in place to limit how many cycles through steps 506-512 may be performed.

Using the method illustrated in FIG. 5, a latency prediction for an access pattern of a particular storage system may be obtained without simulating the operation of the storage system. Consequently, the computational cost for generating these predictions may be relatively low.

After a latency prediction is obtained, it may trigger the performance of a set of actions. The actions may include, for example, providing the latency prediction to another entity, determining that a storage system will or will not be suitable for a particular task, determining that a storage system may or may not effectively perform a particular workload (e.g., a workload that would generate the access pattern obtained in step 500), and/or other actions. Consequently, a system in accordance with embodiments of the invention may utilize this method to improve the operation of the components of the system.

To further clarify embodiments of the invention, a nonlimiting example is provided in FIGS. 6.1-6.5. These figures illustrate diagrams of traces that may be generated by a system similar to that illustrated in FIG. 1.

Example

Consider a scenario as illustrated in FIG. 1 in which an information handling system (110) is to provide resource management services to client (100). To provide the services, the information handling system (110) obtains a trace as illustrated in the trace diagram of FIG. 6.1. The trace was gathered from measurements of the operation of a data storage system.

To provide the management services, the information handling system beings by calculating the concurrency of the traces. As seen from the trace diagram of FIG. 6.1, the trace includes six accesses and the corresponding responses of the storage system. For access one, a concurrency level of two is identified. For access two, a concurrency level of two is also identified (e.g., because responses to accesses one and two overlap each other in time).

For access three, a concurrency level of three is identified. Similarly, a concurrency level for three is also identified for accesses four and five. A concurrency level of two is identified for access six.

Using the trace, identified access time, and baseline media access times provided by a media profile for the storage system, a concurrency effect model is generated to identify the increments to the baseline media access times included in the actual access times illustrated in FIG. 6.1. In other words, the resulting output of the machine learning model is, as illustrated in FIG. 6.2 for access with identifier 6, the response times of each access divided into a baseline portion (600) and an increment portion (602). The increment portion (602) representing the latency due to concurrency levels of accesses as opposed to the media configuration of the storage system.

Now that the concurrency effect model is obtained, the information handling system may be ready to service requests for latency predictions.

Turning to the discussion of FIG. 1, a user of one of the clients (100) decides that they would like to utilize a new piece of graphics processing software that heavily utilizes a storage system employed by the client. Once installed, the operation of the client (100) is sluggish and the user is concerned that the storage system of the client may be causing the poor performance.

To ascertain whether the client is able to effectively utilize the new piece of graphics processing software, the user sends a latency prediction request to the information handling system. In the prediction request, the user monitors an access pattern of the storage system by the graphics processing software.

The client provides the trace along with several potential media configurations of the storage system of the client as part of the latency prediction request to the information handling system. A trace diagram of the access request is illustrated in FIG. 6.3. As seen in FIG. 6.3, the trace includes six accesses.

To determine the latency of the storage system due to the access pattern under the different potential media configurations, the information handling system beings by calculating the concurrency of each of these accesses. Specifically, the information handling system determines that the first access has a concurrency level of one, the second access has a concurrency level of two, the third access has a concurrency level of four, the fourth access has a concurrency level of three, the fifth access has a concurrency level of three, and the sixth access has a concurrency level of one.

Using these concurrency levels, the trace illustrated in FIG. 6.3, and the baseline media access time for one of the media configurations for the storage system as input for the concurrency effect model, the trace illustrated in FIG. 6.4 is generated. As seen in FIG. 6.4, the trace includes time increments to each response time as illustrated by the portion of each box filled with dotting.

The increase in response times changes the concurrency levels of the access requests. In the resulting traces in FIG. 6.4 the concurrency levels of the first access is two (previously, as seen in FIG. 6.3, it was one), the second access has a concurrency level of four (previously two), the third access has a concurrency level of four (unchanged), the fourth access has a concurrency level of four (previously three), the fifth access has a concurrency level of four (previously three), and the sixth access has a concurrency level of two (previously one). These changes in the concurrency levels may be considered significant, indicating that the concurrency estimate for each access is inaccurate, and so the concurrency estimate for the access is updated in the resulting trace.

To do so, a new trace as illustrated in FIG. 6.5 is generated using the trace in FIG. 6.4, with updated concurrency levels, as input to the concurrency effect model. In other words, the processes of generating the trace in FIG. 6.4 is repeated but using the trace in FIG. 6.4 rather than 6.1 as input. A seen in FIG. 6.5, the resulting trace has an increase in response times. However, the increases are not large enough to result in a change in concurrency level of any of the accesses.

For example, the first access has a concurrency level of two (just like in FIG. 6.4), the second access has a concurrency level of three (just like in FIG. 6.4), the third access has a concurrency level of four (just like in FIG. 6.4), the fourth access has a concurrency level of three (just like in FIG. 6.4), the fifth access has a concurrency level of four (just like in FIG. 6.4), and the sixth access has a concurrency level of two Because the concurrency levels did not change significantly from FIG. 6.4 to FIG. 6.5, the trace in FIG. 6.5 is used to estimate the latency of the response to the access pattern shown in FIG. 6.3.

The increased response times in FIG. 6.5 may indicate that the media configuration of the storage system used to generate the trace is a poor choice because it leads to long periods of access latency for the accesses being employed by the graphics processing software.

The information handling system may repeat this processes for different media configurations, with different baseline response times, until a media configuration that provides an acceptable level of latency associated with the access pattern illustrated in FIG. 6.3. The information handling system may notify the client of the media configuration. In turn, the client may modify its media configuration to match the media configuration provided by the information handling system. By doing so, the sluggish performance of the graphics processing software may be improved thereby improving the user experience of the use of the client End of Example Thus, as illustrated in FIGS. 6.1-6.4, embodiments of the invention may provide an information handling system that manages resources of the system in a manner that may improve the operation and corresponding user experience of the system.

Figure 7:
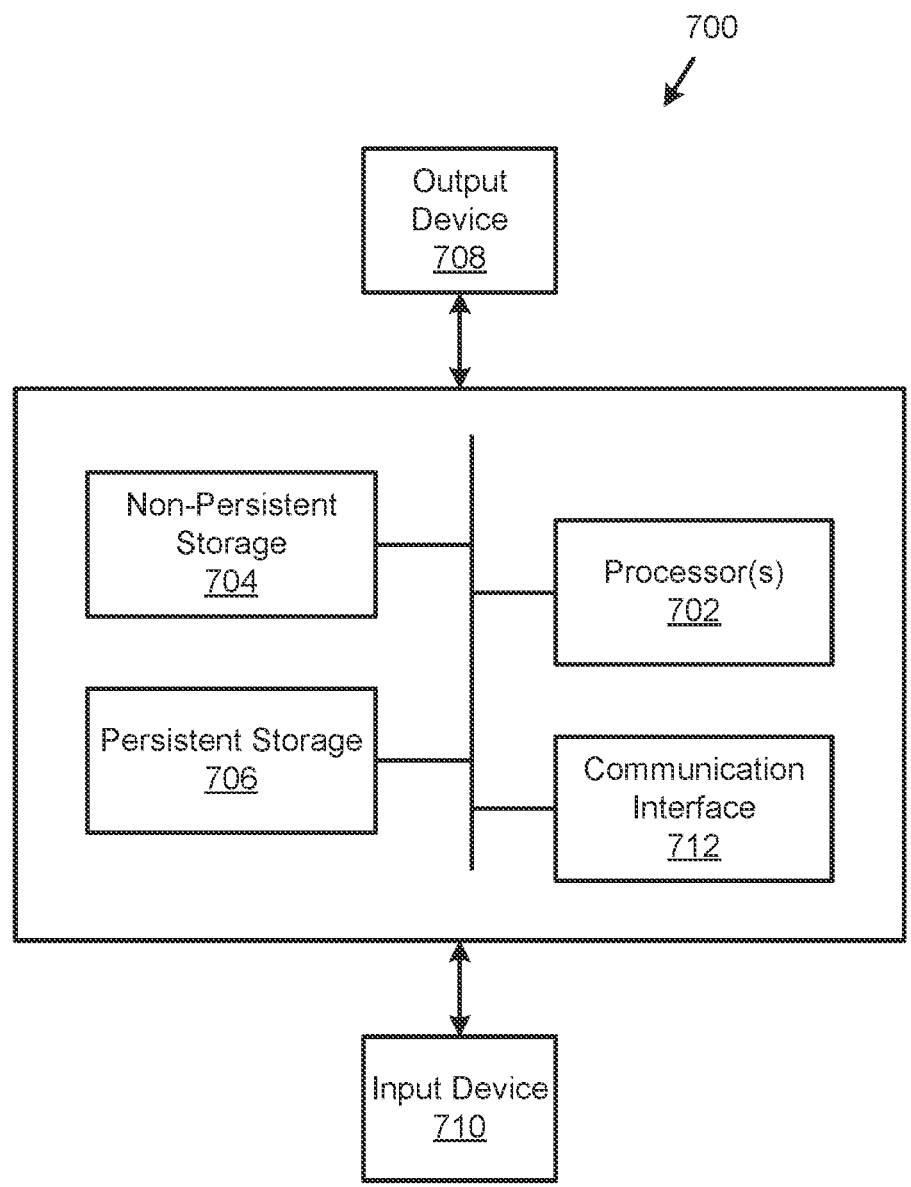
FIG. 7 shows a diagram of a computing device in accordance with one or more embodiments of the invention.

As discussed above, embodiments of the invention may be implemented using computing devices. FIG. 7 shows a diagram of a computing device in accordance with one or more embodiments of the invention. The computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), input devices (710), output devices (708), and numerous other elements (not shown) and functionalities. Each of these components is described below.

In one embodiment of the invention, the computer processor(s) (702) may be an integrated circuit for processing instructions. For example, the computer processor(s) may be one or more cores or micro-cores of a processor. The computing device (700) may also include one or more input devices (710), such as a touchscreen, keyboard, mouse, microphone, touchpad, electronic pen, or any other type of input device. Further, the communication interface (712) may include an integrated circuit for connecting the computing device (700) to a network (not shown) (e.g., a local area network (LAN), a wide area network (WAN) such as the Internet, mobile network, or any other type of network) and/or to another device, such as another computing device.

In one embodiment of the invention, the computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing devices exist, and the aforementioned input and output device(s) may take other forms.

Embodiments of the invention may provide a system and method for providing computer implemented services. Specifically, embodiments of the invention may provide information handling systems that provide resource management services. The resource management services may ascertain whether a particular configuration and/or components of a storage system will be likely to service data access requests having particular forms (e.g., access patterns). To make the determinations, the information handling systems may take into account concurrency present in the access patterns when determining likely latency in responses due to the access patterns. By doing so, the information handling system is more likely to accurately predict whether a particular configuration and/or components set of a storage system will be likely to service a workload.

If it is determined that the particular configuration and/or components set of the storage system is unlikely to be able to service a workload (e.g., in a desired manner), then the information handling system may identify whether other configurations and/or component sets may be able to service the workload.

Thus, embodiments of the invention may address the problem of limited resources for servicing workloads. For example, by identifying concurrency with access patterns, the system may generate more accurate latency predictions for access patterns thereby better enabling decisions to be made regarding storage systems (e.g., configuration, components of, whether certain workloads with corresponding access patterns should be performed or whether different workload with other access patterns should be performed based on limited existing storage systems).

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention. Accordingly, the scope of the invention should be limited only by the attached claims.

What is claimed is:

1. An information handling system for managing a storage system, comprising:
    storage for storing a concurrency effect model for the storage system; and
    a storage manager programmed to:
        obtain a request for a latency prediction for the storage system;
        obtain media access time estimates for the storage system using a trace that specifies:
            a series of accesses; and
            responses, by the storage system, to the series of accesses, wherein the media access time estimates are baseline response times for the series of accesses;
        obtain concurrency estimates for the trace using the media access time estimates;
        obtain modifications for the media access time estimates using:
            the concurrency effect model; and
            the concurrency estimates, wherein the modifications are additional duration of time beyond each of the baseline response times;
        update the media access time estimates using the modifications to obtain the latency prediction for the storage system; and
        perform an action set, based on the latency prediction, to manage operation of the storage system, wherein the action set comprises:
            providing the latency prediction for the storage system to an entity;
            making a determination that the latency prediction meets a predetermined requirement, wherein the predetermined requirement indicates that the latency prediction is desirable; and
            in response to the determination, configuring operation of the storage system based on a configuration associated with the trace.

2. The information handling system of claim 1, wherein the storage manager is further programmed to:
    prior to obtaining the request for a latency prediction:
        obtain a second trace and a media configuration profile for the storage system;
        obtain second concurrency estimates using the second trace and the media configuration profile;
        generate the concurrency effect model using the concurrency estimates, the second trace, and the media configuration profile.

3. The information handling system of claim 2, wherein the concurrency effect model is generating using a machine learning algorithm that takes, as input, the second trace, second concurrency estimates, and the media configuration profile.

4. The information handling system of claim 1, wherein the storage system comprises a storage device and a cache for the storage device.

5. The information handling system of claim 1, wherein the trace was obtained while the storage system was operating based on the configuration.

6. A method for managing a storage system, comprising:
    obtaining a request for a latency prediction for the storage system;
    obtaining media access time estimates for the storage system using a trace that specifies:
        a series of accesses; and
        responses, by the storage system, to the series of accesses, wherein the media access time estimates are baseline response times for the series of accesses;
    obtaining concurrency estimates for the trace using the media access time estimates;
    obtaining modifications for the media access time estimates using:
        a concurrency effect model associated with the storage system; and
        the concurrency estimates, wherein the modifications are additional duration of time beyond each of the baseline response times;
    updating the media access time estimates using the modifications to obtain the latency prediction for the storage system; and
    performing an action set, based on the latency prediction, to manage operation of the storage system, wherein the action set comprises:
        providing the latency prediction for the storage system to an entity;
        making a determination that the latency prediction meets a predetermined requirement, wherein the predetermined requirement indicates that the latency prediction is desirable; and
        in response to the determination, configuring operation of the storage system based on a configuration associated with the trace.

7. The method of claim 6, further comprising:
    prior to obtaining the request for a latency prediction:
        obtaining a second trace and a media configuration profile for the storage system;
        obtaining second concurrency estimates using the second trace and the media configuration profile;
        generating the concurrency effect model using the concurrency estimates, the second trace, and the media configuration profile.

8. The method of claim 7, wherein the concurrency effect model is generating using a machine learning algorithm that takes, as input, the second trace, second concurrency estimates, and the media configuration profile.

9. The method of claim 6, wherein the storage system comprises a storage device and a cache for the storage device.

10. The method of claim 6, wherein the trace was obtained while the storage system was operating based on the configuration.

11. A non-transitory computer readable medium comprising computer readable program code, which when executed by a computer processor enables the computer processor to perform a method for managing a storage system, the method comprising:

obtaining a request for a latency prediction for the storage system;

obtaining media access time estimates for the storage system using a trace that specifies:
- a series of accesses; and
- responses, by the storage system, to the series of accesses, wherein the media access time estimates are baseline response times for the series of accesses;

obtaining concurrency estimates for the trace using the media access time estimates;

obtaining modifications for the media access time estimates using:
- a concurrency effect model associated with the storage system; and
- the concurrency estimates, wherein the modifications are additional duration of time beyond each of the baseline response times;

updating the media access time estimates using the modifications to obtain the latency prediction for the storage system; and performing an action set, based on the latency prediction, to manage operation of the storage system, wherein the action set comprises:
- providing the latency prediction for the storage system to an entity;
- making a determination that the latency prediction meets a predetermined requirement, wherein the predetermined requirement indicates that the latency prediction is desirable; and
- in response to the determination, configuring operation of the storage system based on a configuration associated with the trace.

12. The non-transitory computer readable medium of claim 11, wherein the method further comprises:

prior to obtaining the request for a latency prediction:
- obtaining a second trace and a media configuration profile for the storage system;
- obtaining second concurrency estimates using the second trace and the media configuration profile;
- generating the concurrency effect model using the concurrency estimates, the second trace, and the media configuration profile.

13. The non-transitory computer readable medium of claim 12, wherein the concurrency effect model is generating using a machine learning algorithm that takes, as input, the second trace, second concurrency estimates, and the media configuration profile.

14. The non-transitory computer readable medium of claim 11, wherein the storage system comprises a storage device and a cache for the storage device.

* * * * *